3,103,449
WOODPECKER REPELLENT METHODS

Anders E. Lund, Pitcairn, Pa., John V. Dennis, Houston, Tex., and John M. Irvine, Wexford, Pa., assignors to Koppers Company, Inc., a corporation of Delaware
No Drawing. Filed May 16, 1962, Ser. No. 195,676
8 Claims. (Cl. 117—147)

This invention relates to a method of combating property damage caused by birds, and more specifically, to a method of protecting wood products from attack by woodpeckers.

There is a great need for an effective and relatively inexpensive method of preventing woodpecker attack on wood products, such as standing utility poles. Great economic waste is occasioned by the attack of woodpeckers causing injury and destruction of valuable standing transmission and distribution utility poles. Accordingly, the prevention of woodpecker attack upon utility poles in the United States has become a serious problem.

Woodpeckers are a well-defined family of birds that are of the order Piciformes. Characteristics of the woodpecker family include a hard, chisel-like bill for boring into wood, stiff tail feathers to assist in climbing, and usually, a boldly patterned plumage. There are twenty-three species of woodpeckers known to occur in the United States.

Woodpeckers are considered generally beneficial insofar as standing forest products and agriculture are concerned. In this respect, they restrict their wood boring activities largely to dead trees, and by ferreting out destructive insects that live in the bark or in dead wood, they perform a service to forestry.

Woodpeckers, however, do inflict severe damage to standing utility poles, and this invention, in one specific aspect, provides a method of preventing such damage.

It is apparent that standing utility poles, although almost universally treated with preservative chemicals such as creosote, are apparently close enough to dead trees in appearance and characteristics to be suited to the wood boring habits of a great many of the woodpecker species.

The type of damage to treated utility poles varies considerably according to the species of woodpeckers involved in the attack. At least seven species of North American woodpeckers inflict enough damage to utility poles to be a serious concern. Two damaging species, the red-shafted flicker, and the yellow-shafted flicker may, if their ranges are combined, be found in wooded and in some relatively treeless districts over most of North America. There are many cases of severe local damage which have been caused by one or the other of the above mentioned flickers.

Another species, the red-headed woodpecker, found most plentifully in central and southeastern portions of the United States, ranks high in destructiveness. The red-headed woodpecker has the habit of attacking nearly every utility pole in the vicinity of his habitat and of making holes characteristically within a few inches of the top of the pole. Similar habits of attacking the tops of poles are shared by the golden-fronted woodpecker of southern Texas and the ladder-backed woodpecker which is found widely through Texas and other states of the southwest United States. The last two mentioned woodpeckers, in addition to attacking the pole proper, will also bore holes into the under sides of the crossarms. The boring into the crossarms so weakens the arms that replacement becomes essential. In fact, one utility company in Texas has been compelled to replace an average of 2,000 crossarms a year because of the costly attack.

The most severe and spectacular attack on utility poles is accomplished by the pileated woodpecker. This bird, which ranges widely through the wooded, mountainous regions of the country, as well as densely forested swamps and lowlands, is a bane to all utility companies that have to contend with it because the bird exerts its greatest damage upon electric transmission poles. The cost of replacing woodpecker damaged transmission poles, especially in swampy districts, sometimes runs as high as $1,000 per pole.

Attack by the pileated woodpecked is largely confined to the mid-portions of the pole. Two general kinds of excavations are made in the poles. One is a rounded hole leading into a deep cavity within the pole. This type of hole which is used as a roosting or nesting site, takes up so much space within a pole that often only a thin shell remains to support the upper portions of the pole with its crossarms and other attachments. The second type of excavation by the pileated woodpecker, and by far the most common, are slits and rectangular holes, some shallow and some deep, which are characteristically like those the bird makes in trees to get at hidden insect life.

From the foregoing, it is obvious that certain kinds of woodpecker attack will weaken poles or crossarms structurally to the degree that replacement is essential. Other kinds of attack, such as holes confined to the extreme top section of the pole, offer no immediate impairment to the structural strength of the pole. However, by opening the pole and letting in moisture to non-treated interior portions of the pole, to thus promote insect attack, fungus and bacteria infection, the usual life expectancy of the pole is greatly reduced.

In seeking out ways to prevent damage to poles by woodpeckers, the cause for the attack has been studied in hopes of finding methods of avoiding the stimulus for the woodpecker attack. Many theories, such as food finding, food storage, construction of nesting and roosting sites or cavities, have been advanced as the reason for woodpeckers seeking out such unnatural areas as distribution poles and telephone poles.

It has been widely assumed that woodpeckers, pressed in some instances by the destruction of natural timber and particularly the cutting down of dead trees, have been forced to seek out the artificial sites provided by utility poles to accomplish the above-mentioned objects. There are many instances, however, in which woodpeckers have left prime natural habitat, so far as their requirements are concerned, to inflict damage upon adjacent utility poles. There have been many instances in which old, discarded woodpecker riddled poles have been left standing near newer replacement poles. Invariably, the woodpeckers deserted the old poles and began attack immediately upon the new ones.

Another very recent and most plausible theory advanced for woodpecker activity on utility poles is that there is a psychological motive in the preference of woodpeckers of the newer utility poles over the older ones. This preference is particularly pronounced in the pileated woodpecker. So acute is the attack at times that considerable numbers of newly erected poles have to be replaced before a completed line is in service.

The theory of psychological attack by woodpeckers is based upon the almost universal habit of birds of mated pairs setting up for themselves special food and nesting territories from which they exclude others of their kind. Among woodpeckers, dead trees are jealously guarded as sources of both food and sites for roosting and nesting. The utility pole being the artificial equivalent of a dead tree is taken possession of by whatever woodpocker pair inhabits the territory within which it is erected. Many species of woodpeckers use the utility pole as a lookout from which to survey the surrounding countryside and with the purpose of watching for any trespass by other woodpeckers. The destructive species with which this invention is most concerned, particularly the pileated woodpecker, seem to translate their possessive instinct into a necessity to attack the pole by drilling holes in it. These holes, functional in design and location, in reality are not likely to serve any useful purpose so far as the woodpecker is concerned. Observations have shown that the novelty of the new pole wears off as does the psychological impulse to attack it, and it has been found that pileated attack is the most severe during the first year that the pole is in service. Attack gradually tapers off and, in several instances, lines with heavy early damage are completely free of attack after an age of around five years.

Even with the foregoing theories advanced as to the reasons for woodpeckers seeking out utility poles and causing damage to them, an effective method of preventing such woodpecker attack has not heretofore been developed.

The utility companies most affected by woodpecker attack have expended a great deal of time and money, seeking out methods of preventing the attack by woodpeckers upon their standing utility poles. Efforts have been made, for example, to reduce the woodpecker population. Efforts in this direction are greatly limited by Federal and State laws which protect woodpeckers because they are birds generally beneficial to forestry and agriculture. Additionally, public sentiment is generally opposed to any large-scale killing programs. Occasional attempts at control under special permits have nevertheless been carried out. These efforts have failed because of the expense involved and secondly, because of a tndency among woodpeckers, as well as birds generally, to move into any habitat that has been made vacant.

Attention has also been given to the use of scaring devices to keep woodpeckers from poles. These methods, using such devices as artificial snakes, have failed completely to deter woodpeckers.

Attempts have also been made to apply paints, chemicals and compounds either to woodpecker damaged parts of poles or to entire poles. The application of paints and other compounds has not been conspicuously successful. A number of utility companies have, nevertheless, found it practical to fill already made woodpecker holes with compounds of various kinds. These include concrete or fiberglass which will tend to stop woodpecker attack at the area of application, while others will protect woodpecker damaged areas from moisture, rot and insect attack. The harder protective compounds, such as concrete, however, present a hazard to pole climbing, as the climber may have his spurs deflected upon contact with a hard surface. More importantly, none of the compounds thus used prevent woodpeckers from establishing new holes in a different area of the same pole.

Finally, all-enclosing protective sheathings have been suggested and used to prevent woodpeckers from penetrating to the surface of the poles thus protected. Of the various materials, both plastic and metal, that have been used as sheathing and attached to poles as a protective device against woodpeckers, only one has met with any degree of success. This sheathing is a hardware cloth generally of 19 gauge, which is wrapped around a pole, starting from about 12 foot elevation to the summit of the pole. The pileated woodpecker is the only species known to have a bill powerful enough to penetrate through the hardware cloth to any degree. The hardware cloth, however, has serious limitations since it is expensive, and its use is justified only as a protection against the extra severe attack of the pileated woodpecker. Of 49 new electric transmission poles covered with hardware cloth and installed in pileated woodpecker country near Houston, Texas, one-fifth were receiving substantial attack through the hardware cloth within only three months of the time the poles were erected. In one case, a bird had broken a hole through the wire cloth large enough to permit it to go in and out of a large hole in the pole which was being excavated as a nesting cavity.

From the foregoing attempts by workers in the art to provide a wood product which is not susceptible to woodpacker attack, it is apparent that the only economical method and practical method of protecting wood products from the attack by woodpeckers would be through the use of a repellent material in the area of the wood which is subject to attack.

There has now been discovered a novel method which, in its preferred embodiments, is adaptable to prevent the attack by woodpeckers on wood products.

In accordance with the present invention, wood susceptible to woodpecker attack is associated with para-benzoquinone using well known coating and impregnation techniques.

Wood products are coated or impregnated with para-benzoquinone in a suitable carrier to provide a retention in and on the wood of sufficient para-benzoquinone to render the wood products free from attack by woodpeckers.

In one embodiment of the present invention, it is possible to impart woodpecker repellent properties to wood by using a solid coating carrier containing the para-benzoquinone repellent material. A concentration of para-benzoquinone of as little as 2 percent by weight in the solid coating carrier is adequate to repel woodpeckers.

In another specific embodiment of the invention, standard impregnation techniques are used to impregnate wood products with para-benzoquinone using a liquid impregnating carrier containing para-benzoquinone repellent material in a suitable concentration.

The solid coating carrier composition and the liquid impregnating carrier composition should contain sufficient para-benzoquinone to ensure a retention in the wood of para-benzoquinone which is adequate to repel woodpecker attack. Generally, the amount of para-benzoquinone contained in the solid coating carrier may be as high as 15 percent by weight of the carrier. Higher concentrations of para-benzoquinone in solid coating carrier are effective but are economically impractical. As little as 2 percent of para-benzoquinone in a solid coating carrier will effectively discourage woodpecker attack. Because the solid coating carrier contains para-benzoquinone dispersed throughout, and because it is applied as a coating, there will be a 100 percent retention of the dispersed para-benzoquinone in the wood when the solid coating carrier material is applied thereto. The amount of para-benzoquinone used in a liquid impregnating carrier will necessarily be of sufficient quantity so that when the wood product is removed from the impregnating vessel, the amount of para-benzoquinone retained in the wood will be effective to repel woodpeckers.

In a specific illustration of the solid coating carrier embodiment of this invention, woodpecker characteristics may be added to a penetrating grease coating composition by adding para-benzoquinone to the penetrating grease composition comprised of an organic wood preservative liquid and a compound of bentonite and an organic nitrogen base. The wood preservative composition found extremely effective for penetrative coating of wood is that described in U.S. Patent 2,904,467. The preparation of the penetrating grease coating comprised of an organic wood preservative liquid and a compound of bentonite and an organic nitrogen base is as follows: the organic wood preservative liquid is prepared by dissolving the organic fungicide such as pentachlorophenol in a suitable solvent such as mineral oil. Then, the bentonite compound is added and stirred into the liquid. Next, a relatively small quantity of methanol, acetone or other organic polar solvent which is used as a dispersing agent is added. Then, any suitable inorganic filler material to be employed is added. The resulting material is a liquid slurry which is then passed through a homogenizer or colloid mill wherein it is subject to 1000–8000 pounds per square inch and the slurry is converted to a grease-like gel.

To prepare the woodpecker repellent formulation, the gel-like material will have added thereto at least 2 percent by weight of para-benzoquinone and then the grease-like material is thoroughly mixed in a Hobart blender for about 5-6 minutes until the para-benzoquinone is thoroughly and homogeneously dispersed throughout.

Using the grease-like material containing pentachlorophenol in combination with para-benzoquinone provides not only a woodpecker repellent composition, but concurrently, there is provided a preservative material for the wood. Thus, a double protection is afforded wood products. Since pentachlorophenol is an effective preservative material for wood, the wood is protected from attack by decay and wood-destroying fungi while concurrently being free from woodpecker attack.

The gel or grease-like composition hereinabove described need not, in all cases, contain the preservative pentachlorophenol material. There are many areas of the country in which a preservative material need only be applied along the ground line of poles which are set in place. For example, in areas of rainfall of about 15 inches or more the grease-like material containing pentachlorophenol is applied to an area on the pole extending from about 6 inches above the ground to about 20 inches below. The woodpecker repellent material, of course, may be extended in use from the ground line to the top of the pole as well as any crossbars, since according to theory, the woodpeckers, in protecting their territorial rights, will seek height. It necessarily follows that the penetrating grease composition described in U.S. Patent 2,197,408 may be prepared with or without pentachlorophenol.

Additionally, the solid coating carrier or liquid impregnating carrier may include a further repellent material. This repellent material would be capable of preventing insect attack into wood products. Such attack normally comes from termites or other wood boring insects. Therefore, an effective termite repellent material, when added to the above described penetrating grease, for example, would provide for poles and other wood structures a three-way defense to the external forces which create economic problems. In this respect, diethyl toluamide in concentrations equivalent to those of para-benzoquinone is added to the coating composition or impregnating solution as desired.

The application of para-benzoquinone by coating means to wood products susceptible to woodpecker attack is not limited to the grease-like substance described above.

In another specific illustration of the solid coating carrier embodiment of this invention, it is possible to use a solid coating carrier material of the emulsion type which is applied to wood in the form of an emulsion which subsequently dries to a film-like coating on the wood. It is possible, for example, to use an oil in water emulsion such as that described in U.S. Patent 2,708,640. A typical formulation for such an emulsion is as follows:

| | | |
|---|---|---|
| Water | gallons | 2½ |
| Triethanolamine | pints | 3 |
| 5% solution of pentachlorophenol in stove oil | gallons | 26 |
| Oleic acid | pints | 12½ |

In this formulation, the water and triethanolamine are mixed to constitute the water phase, and following agitation thereof to obtain a thorough mixture, the remaining ingredients constituting the oil phase, are gradually added with continued agitation until the desired consistency is obtained. To this emulsion may be added para-benzoquinone in the concentrations hereinabove described to provide another useful coating for wood products capable of rendering the wood products repellent to the attack of woodpeckers.

Other solid carriers may be used in this embodiment such as clays which are useful for repairing damaged areas of wood products which had not previously been protected according to the method of this invention. Representative clays include the kaolin group, the montmorillonite group, the variously named illite, bravaisite, or hydromica group, attapulgite, and allophane.

In the particular areas wherein a solid coating carrier would not be used to coat wood with a preservative, as well as a repellent, it would be advantageous to impregnate the wood under pressure with a solution of preservative and the para-benzoquinone material.

Thus, in the liquid impregnating carrier embodiment of this invention, para-benzoquinone may be impregnated into wood under pressure to provide a wood product containing the woodpecker repellent distributed throughout.

Pressure impregnation of wood is conveniently accomplished by a full or empty cell cycle. The object of the full cell process is to thoroughly fill the capillary structure of the wood with the treating solution. This is accomplished by subjecting the treating reactor containing the wood to be treated to a vacuum of 22-26 inches of mercury for a period of time ranging from 15 minutes to an hour. The reactor is then filled with treating solution and subjected to a pressure of about 125-200 p.s.i. at 25-100° C. for about 1½-3 hours. The larger and more refractory pieces of wood require either a longer vacuum period or longer pressure period, or perhaps both. For most woods, a 15 minute vacuum of 25.26 inches of mercury followed by a 2 hour pressure period of 160 p.s.i. at 50-60° C. is adequate.

Other standard impregnation techniques known to the art can also be used, depending of course, on the physical nature of the wood. For example, impregnation may be accomplished by soaking, by vacuum impregnation at atmospheric pressure, by alternate application of pressure and vacuum, etc., or by the empty cell process. The empty cell process involves forcing the impregnating solution under pressure into wood containing air. The back pressure caused by compressing the air within the wood forces out part of the solution when the pressure is released.

Another example of the type of impregnation used to impregnate the wood with para-benzoquinone repellent material would be as follows: when the wood has been subjected to pressure treatment, for example, to impregnation with pentachlorophenol, an alcohol or oil solution containing a benzoquinone could be sprayed onto the wood after impregnation and during the cooling period. In this manner, the sprayed solution would penetrate into the wood during the cooling step because of the vacuum set up within the wood under the cooling reaction.

We have discussed, in a general way, methods of obtaining particular improvements in the property of wood. In the examples that follow, methods of enhancing three properties of the wood, e.g. woodpecker repellency, decay resistance, and insect repellency are described in detail.

Wood treated according to the method of this invention is evaluated in respect thereof. The following are examples of actual compositions and tests made in accordance with the foregoing methods.

EXAMPLE I

A wood preservative containing penetrating grease is prepared having the following composition:

| | Percent |
|---|---|
| Dicetyldimethyl ammonium bentonite | 10 |
| Aromatic HB oil | 78.6 |
| Pentachlorophenol | 10 |
| Acetone | 1.4 |

This composition was prepared according to the method as taught in U.S. Patent 2,904,467. To the thus prepared grease was added 10 percent by weight of para-benzoquinone. The penetrating grease containing the added para-benzoquinone was then subjected to mixing in a Hobart blender until the para-benzoquinone was homogeneously distributed throughout. The resultant product was a penetrating material having as ASTM penetration of 294, excellent resistance to bleeding, and a satisfactory penetration into wood.

As a measure of the repellent characteristics of the above prepared formulation, 4 out of 59 replacement electric transmission poles in the Houston, Texas, area were coated therewith. The other 55 poles were protected with 19 gauge, ½ inch hardware cloth. The 4 poles containing the repellent grease material were free from woodpecker attack during a three month testing period. Conversely, within a two month period, 8 of the hardware cloth protected poles were receiving attack through the hardware cloth in 17 separate places.

Several penetrating grease formulations described below were prepared following the procedure of Example I in which the amount of para-benzoquinone added to the coating material was varied. Samples of these formulations were also tested on utility poles and in all cases the formulations were found effective for preventing woodpecker attack.

EXAMPLE II

Part 1

| | Percent |
|---|---|
| Dicetyldimethyl ammonium bentonite | 7.5 |
| Aromatic HB oil | 81.8 |
| Methanol | 0.7 |
| Pentachlorophenol | 10.0 |

Part 2

| | |
|---|---|
| Para-benzoquinone | 2 |

EXAMPLE III

Part 1

| | |
|---|---|
| Dicetyldimethyl ammonium bentonite | 7.0 |
| Heavy aromatic naphtha | 82.3 |
| Methanol | 0.7 |
| Pentachlorophenol | 10.0 |

Part 2

| | |
|---|---|
| Para-benzoquinone | 4 |

EXAMPLE IV

Part 1

| | |
|---|---|
| Dicetyldimethyl ammonium bentonite | 3.5 |
| Aromatic HB oil | 72.5 |
| Methanol | 1.0 |
| Pentachlorophenol | 10.0 |
| Silica (HI-SIL 233) | 13.0 |

Part 2

| | |
|---|---|
| Para-benzoquinone | 8 |

EXAMPLE V

Part 1

| | |
|---|---|
| Dicetyldimethyl ammonium bentonite | 10.7 |
| Coal tar creosote | 87.9 |
| Methanol | 1.4 |

Part 2

| | |
|---|---|
| Para-benzoquinone | 10 |

EXAMPLE VI

Part 1

| | |
|---|---|
| Dicetyldimethyl ammonium bentonite | 10.0 |
| Coal tar creosote | 44.3 |
| Heavy aromatic naphtha | 40.0 |
| Pentachlorophenol | 4.3 |
| Methanol | 1.4 |

Part 2

| | |
|---|---|
| Pana-benzoquinone | 12 |

EXAMPLE VII

Part 1

| | |
|---|---|
| Dicetyldimethyl ammonium bentonite | 7.0 |
| Tidewater diesel oil | 86.1 |
| Methanol | 2.4 |
| Pentachlorophenol | 4.5 |

Part 2

| | |
|---|---|
| Para-benzoquinone | 15 |

Additional examples were prepared in which at least 2 percent by weight of the coating formulation of diethyl toluamide was added to provide insect repellency to the coating material. In this respect, the procedure of Example I was followed with the additional step of mixing diethyl toluamide into the formulation simultaneously with the para-benzoquinone.

EXAMPLE VIII

Using the full cell process, a solution of 20 percent of para-benzoquinone in benzene is prepared and utility poles 15 inches in diameter are subjected to impregnation of this solution. The treating reactor containing the wood is subjected to a vacuum of 22–26 inches of mercury for about one hour. The reactor is then filled with treating solution and subjected to a pressure of about 125–200 p.s.i. at about 100° C. for three hours. The wood is then removed from the treating reactor and cooled. This pole containing the para-benzoquinone repellent treating material is then capable of standing use as an electric transmission or electrical distribution pole of long life because of the woodpecker repellent characteristic provided thereto by the para-benzoquinone.

The specific examples described above are by no means limiting in the methods of preparing wood products for defense against voracious woodpeckers. It is possible, for example, to impregnate wood using the para-benzoquinone repellent materials in liquefied petroleum gas carrier while simultaneously impregnating the wood with pentachlorophenol preservative.

We have thus provided a novel method whereby wood can be stabilized against woodpecker attack while simultaneously rendered decay resistant. Wood treated according to the novel method of the present invention is quite suitable for exterior use as electric transmission poles, electrical distribution poles, fence posts and the like.

We claim:

1. A process for protecting wood products which are susceptible to attack by woodpeckers which comprises associating therewith para-benzoquinone.

2. A process for protecting wood products which are susceptible to attack by woodpeckers which comprises associating therewith a solid coating carrier containing para-benzoquinone.

3. Process according to claim 2 in which said solid coating carrier is an emulsion.

4. A process for protecting wood products which are susceptible to attack by woodpeckers which comprises associating therewith a penetrating grease containing at least 2 percent by weight of para-benzoquinone.

5. A process for protecting wood products which are susceptible to attack by woodpeckers comprising impregnating said wood under pressure with a solution of para-benzoquinone in liquid wood-impregnating carrier.

6. A process for protecting wood products which are susceptible to attack by woodpeckers, which comprises coating said wood product with a solid coating carrier composition, said coating carrier composition consisting essentially of a wood preservative composition comprising at least 2 percent of pentachlorophenol, 50–95 percent of a mineral oil solvent for the pentachlorophenol and a compound of bentonite and an organic-nitrogen base in an amount sufficient to impart a grease-like consistency to said composition, said wood preservative composition having added thereto para-benzoquinone in an amount of at least 2 percent by weight of said wood preservative composition.

7. A wood product coated with a solid coating carrier containing para-benzoquinone.

8. A wood product containing para-benzoquinone impregnated therein.

References Cited in the file of this patent

UNITED STATES PATENTS

| | | |
|---|---|---|
| 2,339,335 | Heckmanns et al. | Jan. 18, 1944 |
| 2,904,467 | Behr | Sept. 15, 1959 |
| 3,049,471 | Behr | Aug. 14, 1962 |

OTHER REFERENCES

Hanna: Handbook of Agricultural Chemicals, 2nd ed., 1958, published by L. W. Hanna, Rte. 1, Box 210, Forest Grove, Oregon, U.S.A., page 286.

Hockenyos: Bird Repellent Compositions, Technical Release No. 8–58, National Pest-Control Association, 250 West Jersey St., Elizabeth, New Jersey. 23 page pamphlet; pages 1, 3–7, 13 and 21 are specifically relied upon.